United States Patent [19]

Blake

[11] 4,282,262
[45] Aug. 4, 1981

[54] DAIRY BASED MIXES FOR FROZEN DESSERTS AND METHOD OF PREPARATION

[75] Inventor: Jon R. Blake, Brooklyn Center, Minn.

[73] Assignee: General Mills, Inc., Minneapolis, Minn.

[21] Appl. No.: 127,028

[22] Filed: Mar. 4, 1980

[51] Int. Cl.³ .................. A23C 23/00; A23G 9/02
[52] U.S. Cl. .................... 426/565; 426/573; 426/575; 426/583; 426/587; 426/399; 426/400; 426/401
[58] Field of Search ............... 426/565, 400, 566, 401, 426/567, 399, 573, 575, 583, 564, 570, 587

[56] References Cited

U.S. PATENT DOCUMENTS

| | | | |
|---|---|---|---|
| 2,827,381 | 3/1958 | Boyd | 426/400 |
| 3,105,763 | 10/1963 | North et al. | 426/400 |
| 3,357,840 | 12/1967 | Fisher | 426/565 |
| 3,431,117 | 3/1969 | Larant | 426/565 |
| 3,434,848 | 3/1969 | Katz | 426/565 |
| 3,746,552 | 7/1973 | Zielinski | 426/565 |
| 3,928,649 | 12/1975 | Cobb | 426/565 |
| 3,949,102 | 4/1976 | Hellyer | 426/565 |
| 3,968,266 | 7/1976 | Baugher | 426/566 |
| 4,012,533 | 3/1977 | Jonas | 426/565 |

Primary Examiner—Jeanette M. Hunter
Attorney, Agent, or Firm—G. O. Enockson; John A. O'Toole

[57] ABSTRACT

Disclosed are dairy based dessert mix compositions which upon aeration can be statically frozen to provide aerated frozen desserts. The dessert compositions essentially comprise from about 15% to 35% of a dry mix fraction and from about 65% to 85% of a concentrated milk blend fraction. The dry mix fraction essentially comprises from about 50% to 70% of the dry mix fraction of a nutritive carbohydrate sweetening agent; from about 3% to 8% of a non-fat dry milk solids; from about 1% to 2% of a whipping agent and from about 0.5% to 2% of a stabilizer gum. The milk blend fraction comprises a concentrated milk blend having from about 1% to 9% fat, from about 17% to 21% non-fat milk solids, from about 0.01% to 0.1% of a stabilizer salt and from about 75% to 64% moisture. The concentrated milk blend has a viscosity of about 20 to 25 cp. (70° F.) and a whey protein nitrogen value of about 1.0 to 1.8. The concentrated milk blend is prepared by forewarming raw milk; concentrating; adding stabilizers, sweeteners and casein reactive gums; heat sterilizing; cooling; homogenizing; further cooling; canning; and aging the milk blend.

20 Claims, 1 Drawing Figure

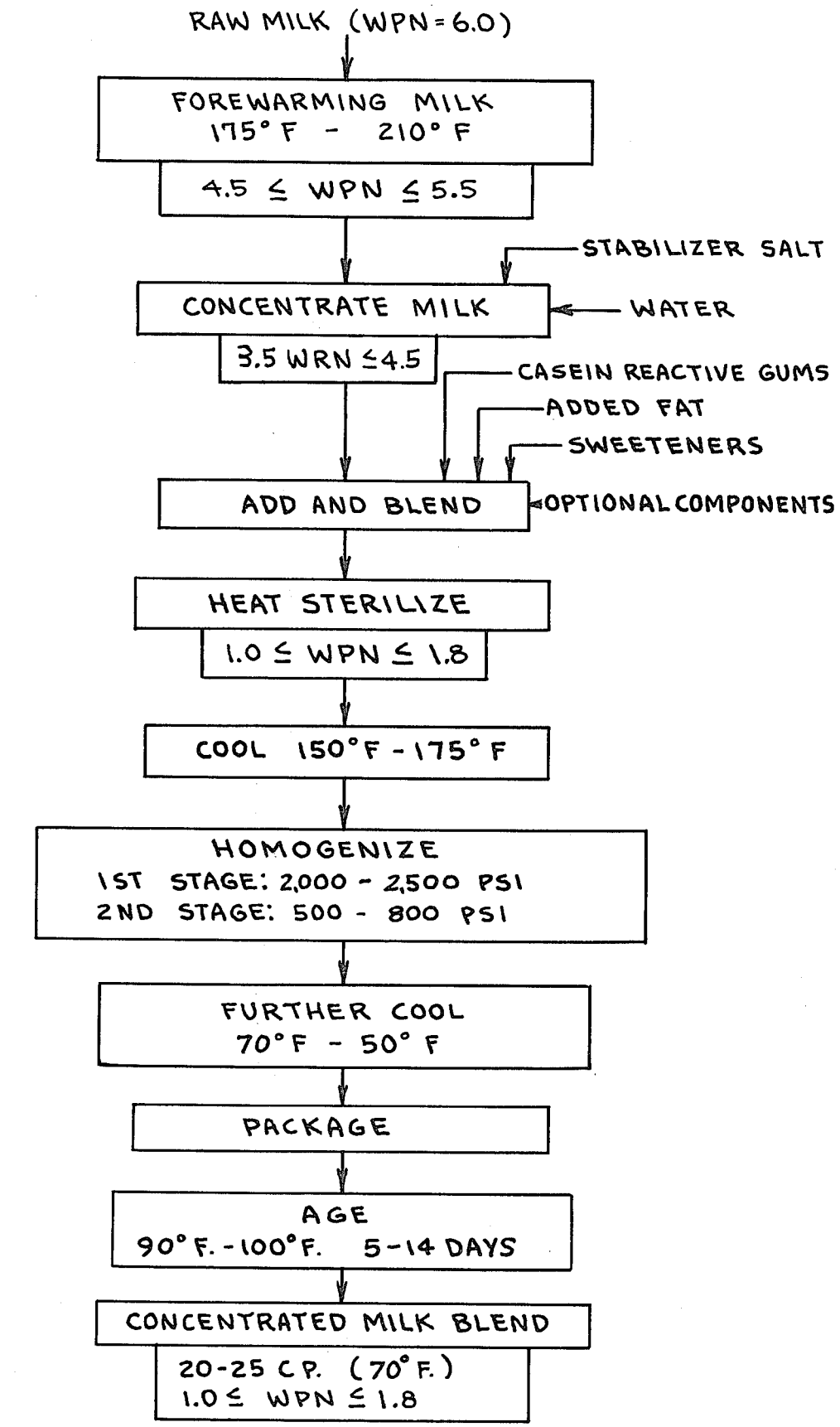

DAIRY BASED MIXES FOR FROZEN DESSERTS AND METHOD OF PREPARATION

BACKGROUND OF THE INVENTION

1. Field of the Invention

The present invention relates to food compositions and to their methods of preparation. More particularly, the present invention relates to dessert mixes for the preparation of dairy based, aerated frozen desserts. In its method aspect, the present invention relates to methods for preparing concentrated milk blends suitable for use in mixes for frozen desserts.

2. The Prior Art

Conventional ice cream is, of course, a popular food item of the dessert type. For at-home consumption, commercially prepared or "retail" ice cream is purchased in an aerated, frozen state. Great care in the storage of conventional retail ice cream must be taken to insure against thawing, e.g., storing in a home freezer. An additional disadvantage is the limitations in the types of dessert items that can be prepared from retail ice cream due to the difficulty in mixing ingredients with ice cream in its aerated, frozen state.

While ice cream can be made at home, it is apparent that it would be desirable to be able to make high quality ice cream comparable to retail ice cream or, generically, other dairy based frozen desserts from a shelf-stable mix without requiring home ice cream-making apparatus by simply whipping the mix ingredients with a home mixer and then statically freezing the aerated mixture in the freezing compartment of the home refrigerator. "Statically freezing" refers to the process step of freezing without concurrent agitation or aeration. Statically freezing desirably eliminates the need for special home freezing apparatus as well as the extra mixture transfer from mixing bowl to freezing apparatus and then to storage or serving containers.

However, there are many difficulties inherent in the preparation of dairy based mixes for aerated frozen desserts which are to be made by a process involving static freezing. Generally, frozen desserts made by static freezing do not compare favorably in consistency and overall appearance to frozen desserts made by the normal commercial process involving agitation during the freezing step. Ordinarily, if such frozen dessert formulations are not agitated during freezing, large ice crystals are formed. Also, the fat phase will tend to separate from the other components of the mix yielding a non-homogeneous product. Such results adversely affect texture, mouthfeel, and uniformity of appearance of the frozen dessert thereby affecting the overall quality of the product.

It would be even more desirable if such dessert mixes could realize statically prepared aerated frozen desserts which are "heat shock" stable. The term "heat shock" is used herein to refer to a partial warming of the frozen product followed by a return to normal storage temperatures which tends to produce a gritty texture due to ice crystal growth. Heat shock instability problems are typically more severe for frozen desserts prepared by static freezing compared to frozen desserts prepared by conventional agitated freezing methods.

Past efforts have included many attempts at realizing dairy based compositions which can be statically frozen to form frozen desserts and which are fully "freeze-thaw" stable. Few have enjoyed any commercial success. However, one presently sold two-packet dessert mix is believed to be based on employing specifically tailored emulsifier systems to achieve stabilization of the polyphasic emulsion as well as to control ice crystal growth during the static freezing step. (See also, U.S. Pat. No. 3,949,102 issued Apr. 6, 1976 to J. A. Hellyer et al. and U.S. Pat. No. 3,968,266 issued July 6, 1976 to W. L. Baugher).

Such compositions, however, are not without disadvantages. The specifically tailored emulsifier/stabilizer system is typically expensive. Moreover, such emulsifier stabilization systems are subject to degradation in emulsifier functionality upon extended storage. Also, the heat shock stability of such products could be improved. Finally, such compositions do not fit the present "natural ingredients" composition presently desired by many consumers.

Accordingly, it is an object of the present invention to provide a dairy based dessert composition which upon aeration and subsequent static freezing exhibits the desirable dessert attributes of mouthfeel, body, and texture which are reminiscent of commercial ice cream.

It is a further object of the present invention to provide dairy based dessert compositions which are substantially free of conventional emulsifiers as well as substantially free of specifically tailored emulsifier/stabilizer systems.

It is a further object of the present invention to provide dairy based dessert compositions which are substantially free of emulsifiers which nonetheless can be statically frozen.

It is a further object of the present invention to provide such statically freezable compositions which exhibit enhanced heat shock stability.

Still another object of this invention is to provide a frozen dessert from mix compositions which are shelf-stable with respect to functional and bacterial deterioration.

It has been surprisingly discovered that the above objectives can be realized and superior dairy based dessert mixes for the static freezing of aerated dessert provided comprising a dry dessert mix fraction and a condensed milk blend dessert fraction which is prepared by the process of the present inventions.

SUMMARY OF THE INVENTION

The present invention relates to two package, dairy based dessert mix compositions which upon aeration can be statically frozen to provide aerated frozen desserts which are highly heat shock stable.

The present dessert compositions essentially comprise from about 15% to 35% of a dry mix fraction and from about 65% to 85% of a concentrated milk blend fraction.

The dry mix fraction essentially contains from about 50% to 70% of the dry mix fraction of a nutritive carbohydrate sweetening agent and from about 3% to 8% low heat non-fat dry milk solids. The dry mix fraction additionally comprises from about 1% to 2% of a whipping agent and from about 0.5% to 2.0% of a stabilizer gum as essential ingredients. The stabilizer gums are selected from the group consisting of xanthan, carrageenan, guar, and mixtures thereof.

The milk blend fraction comprises a concentrated milk blend having a total fat content essentially of about 1% to 9% of the milk blend. Non-fat milk solids comprise from about 17% to 21%. Nutritive carbohydrate sweetening agents comprise from about 1% to 7% of the milk blend fraction. Stabilizer salts are essentially present in the milk blend at from about 0.01% to 0.1%. Casein reactive gums are present at from about 0.001% to 0.1%. The moisture content of the milk blend is essentially between about 65% to 75%. The viscosity of the milk blend essentially ranges between about 20 cp. to 25 cp. and the whey protein nitrogen value of about 1.0 to 1.8.

In its method aspect, the present invention resides in a method of preparing a concentrated milk blend useful in the provision of frozen desserts. The present method comprises the steps of (A) forewarming of raw milk, (B) concentrating, (C) adding sweeteners and casein reactive gums, (D) heat sterilizing, (E) cooling, (F) homogenizing, (G) further cooling, (H) canning, and (I) aging the milk blend.

BRIEF DESCRIPTION OF THE DRAWINGS

FIG. 1 is a process diagram of the present method for preparing a concentrated milk blend.

DETAILED DESCRIPTION OF THE INVENTION

The two packet mixes for frozen desserts of the present invention comprise (A) a dry mix fraction and (B) a milk blend fraction. Both of these essential components of the present dessert mixes as well as optional components, mix preparation, and dessert mix use are discussed in detail below.

Throughout the specification and claims, percentages are by weight and temperatures are given in degrees Fahrenheit unless otherwise indicated.

A. DRY BLEND FRACTION

One essential component of the present two package frozen dessert mix is a dry blend fraction comprising a nutritive carbohydrate sweetening agent, non-fat dry milk solids, whipping agents, and particular gums. Optionally, the dry mix can contain any dry materials used to improve flavor or appearance of the frozen dessert prepared from the present mixes. This dry blend fraction comprises from about 15% to 35% and preferably from about 20% to 25% of the present dessert mix. For best results, the dry mix comprises from about 20% to 23% of the present frozen dessert mix.

1. Sweetening Agent

The dry mix fraction essentially comprises from about 50% to 75%, preferably 60% to 70%, of the dry mix of a nutritive carbohydrate sweetening agent. For best results, the sweetening agent can comprise from about 65% to 70% of the dry mix fraction. The term "nutritive carbohydrate sweetening agent" is used herein to include those typical sweetening agents conventionally used in food products. Of course, the present nutritive carbohydrate sweetening agents are to be distinguished from non-nutritive sweetening agents such as saccharine, cyclamate and the like. Additionally, the present carbohydrate sweetening agents are to be distinguished from such protein-based sweetening agents as aspartaine, thaumatin and monellin.

Suitable materials for use as nutritive carbohydrate sweetening agents are well known in the art. Examples of sweetening agents include both monosaccharide and disaccharide sugars and polysaccharides and their degradation products such as sucrose, invert sugar, dextrose, glucose, lactose, honey, maltose, fructose, maple syrup, and starch hydrolyzate syrups such as corn syrup. Preferred nutritive carbohydrate sweetening agents are those selected from the group consisting of sucrose, dextrose, corn syrup and honey. Of course, mixtures of the above-noted materials are contemplated herein.

Selection of particular ingredients or blends thereof for use as the nutritive carbohydrate sweetening agents will pose no problem for the skilled artisan. As is generally known in the art, the main attributes of frozen desserts which are affected by the various ingredients, including sweetening agents, and which it is desired to control are:

(1) Freezing point and heat shock or freeze-thaw stability.
(2) Melt-down.
(3) Chewiness.
(4) Smoothness, e.g., no graininess due to crystallization of certain sugars, i.e., lactose and sucrose.
(5) Flavor.
(6) Sweetness.

Freezing point and freeze-thaw stability are closely interrelated. It is known that lower molecular weight bodies depress the freezing point of frozen desserts the most and higher molecular weight bodies, the least. If the freezing point of an ice cream mix, for example, is depressed too much, the mix will not freeze at the temperature range used for freezing ice cream, e.g., about 18° to 24° F., and the ice cream will be too soft. On the other hand, if the freezing point is not low enough, the ice cream will become too hard at this range. Furthermore, frozen desserts must withstand fluctuations in temperature from the time they are frozen until they are served. During this time, when they are subject to sharp changes in temperatures, they must retain their proper structure. High molecular weight bodies aid in freeze-thaw stability by virtue of the fact that they depress the freezing point less than the lower molecular weight bodies and also have certain water binding properties.

A frozen dessert should have proper melt down characteristics, that is, it should not melt too slowly nor too quickly. Also, it should have a smooth liquid consistency upon melting, its components should not separate from each other. If too many low molecular weight materials are present, it may melt too quickly and the components may separate from each other and, if too many high molecular weight components are present, it may not melt as quickly as desired.

Higher molecular weight bodies impart chewiness to ice creams, but, if present in excessive amounts, the ice cream becomes gummy and rubbery.

In order to maintain smoothness in frozen desserts, crystallization of carbohydrate components should be avoided as well as the formation of large ice crystals. It is known that the more different saccharides there are present in a frozen dessert, the more the crystallization of each individual saccharide is inhibited. The water binding capacity of the higher molecular weight bodies aids in preventing the formation of ice crystals.

It is desirable also that there be no interference with or masking of flavors which are added to the frozen dessert mix, e.g., vanilla or various fruit flavors. It is known that certain ingredients in a sweetening composition can impart new, undesirable off-flavors or characteristic flavors of their own to the mix. Therefore, care must be exercised in using sweeteners which do not detract from the flavors but rather enhance them.

Sucrose has always been used in substantial amount to provide sweetness in frozen desserts. Hence, any substitute for sucrose must not interfere with the sweet taste associated with sucrose. Therefore, any material used in combination with sucrose must not only be compatible in all respects therewith, but also must not interfere with the other desirable properties of a frozen dessert.

The effects, both desirable and undesirable, of corn syrups and their various components on the various properties of frozen desserts, when used in limited amounts in combination with sucrose as a sweetener, are known. For example, it has been suggested that up to 50 percent, dry basis, of the sweetener used in frozen desserts (exclusive of sugars naturally occurring in other ingredients) may be corn syrup. In common practice, sweeteners for frozen desserts consist of about 33 to 40 percent, dry basis, of corn syrup and the balance, sucrose. It is generally accepted by those skilled in the art that it is not possible to use more than about 50 percent of corn syrups, dry basis, of the sweetener in frozen desserts because the disadvantages at higher levels offset the advantages. For example, inasmuch as most corn syrups are not as sweet as sucrose, it is believed that a large proportion of the sweetener must consist of sucrose. Further, certain flavors, e.g., cereal flavors, are associated with certain corn syrups and these are believed to be imparted to the final product or to mask added flavors. In addition, the other effects of the components on freezing, stability, body and texture are said to be either too great or too little.

2. Non-Fat Dry Milk Solids

Conventional low heat non-fat dry milk solids essentially comprise from about 3% to 8%, preferably from about 5% to 6% of the present dry mix fraction. The term "low heat" is used herein in its conventional usage in the food industry to refer to the dehydrated milk which is prepared at temperatures generally not exceeding about 140° F.

3. Whipping Agent

The dry mix fraction of the present frozen dessert compositions also essentially contain from about 1% to 2% of a whipping agent. Better results are obtained when the present dry mix fraction contains from about 1.0% to 1.5% of the whipping agent. For best results, the whipping agent is present in the dry blend fraction at about 1.02%.

Whipping agents are well known in the food art and selection of suitable materials for use herein as the whipping agent will pose no problem to the skilled artisan. (See, for example, U.S. Pat. No. 3,889,001 issued June 10, 1975 to N. F. Buide et al.) Suitable materials can be derived as protein hydrolyzates, for example, caseinate, whey (see, for example, U.S. Pat. No. 4,089,987 issued May 16, 1978 to P. K. Chang) and various vegetable proteins. The protein hydrolyzates employed herein are water soluble (i.e., soluble at least to about 20% by weight at 25° C.) The soy protein hydrolyzates disclosed in U.S. Pat. No. 3,814,816 (issued June 4, 1974 to R. C. Gunther), are particularly effective whipping proteins. These proteins are commercially available from Staley Manufacturing Company, Decatur, Ill. and may be prepared by initially chemically hydrolyzing the soy protein to a prescribed viscosity range and thereafter enzymatically hydrolyzing the soy protein with pepsin to produce a pepsin modified hydrolyze soy protein whipping agent. Each of the above patents are incorporated herein by reference.

4. Stabilizer Gums

Another essential component of the present dry mix is a hydrocolloidal stabilizer gum. The stabilizer gum essentially is present in the dry mix fraction within about 0.5% to 2%., preferably from about 0.8% to 1.2%.

The physical and chemical properties of edible polysaccharide gums and their use are well known in the food art and selection of specific gums for use as the stabilizer gums for the present dessert mixes will pose no problem to the skilled artisan (see, for example, "Gum Technology in the Food Industry," M. Glicksman, Academic Press, N.Y., 1969; "Food Colloids," ed. by H. D. Graham, Avi Publishing Co., Westport, Conn., 1977; and "Industrial Gums," R. L. Whistler, 2nd ed., Academic Press, N.Y., 1973; and "Hydrocolloids (Natural Plant)," Encyclopedia of Food Science, ed. by M. S. Peterson and A. H. Johnson, The Avi Publishing Co., Westport, Conn., 1978, each of which is incorporated herein by reference). Preferred suitable gums for use herein are selected from the group consisting of guar gum, locust bean gum, xanthan gum and mixtures thereof. Best results in terms of mouthfeel, syneresis inhibition and aeration stability are realized when the polysaccharide gum is xanthan gum.

5. Optional Components

The dry mix fraction of the present dessert mixes can contain a variety of additional dry ingredients suitable for rendering the frozen desserts prepared from the present mixes more organoleptically, aesthetically desirable or nutritious. Such optional ingredients include, for example, flavors, coloring agents, nuts, vitamins, preservatives, and the like. If present, such minor dry optional components can comprise from about 0.1% to 2.5% of the dry mix fraction.

Another highly preferred dry blend component is a spray dried oil. Such dried oils are prepared by cospray drying an oil in water emulsion containing matrix materials, e.g., dextrans, gums, that upon dehydration serve as carriers for the oil.

B. MILK BLEND FRACTION

The second essential component of the present two package frozen dessert mix is a milk blend fraction. This milk blend fraction comprises a specially prepared, concentrated blend of milk, sugar(s), stabilizer salts and casein reactive gums. This milk blend fraction comprises from about 65% to 85%, preferably from about 75% to 80% of the total frozen dessert mix compositions herein. A flow diagram of the present method for preparing a concentrated milk blend is given in FIG. 1.

Forewarming Milk

In the present invention, raw milk is desirably first forewarmed before concentration. Forewarming prepares the milk proteins so that protein precipitation will not occur during the subsequent milk concentration step. Forewarming of raw milk is a conventional step in the canned, concentrated milk industry. However, it has been surprisingly discovered herein that milk forewarmed in the manner conventional to the concentrated milk industry is not suitable for use herein since conventional forewarming excessively denatures the milk proteins.

Any heat treatment of milk can serve to partially denature milk proteins. The extent of milk protein denaturation or hydration is determined by the Standard Whey Protein Nitrogen test (hereinafter "WPN") in the milk industry. (See "Standards For Grades of Dry Milks Including Method of Analysis," pg. 49 under "Determination of Undenatured Whey Protein Nitrogen in Non-Fat Dry Milk," published by The American Dry Milk Industry, 1971). Generally, the WPN is given a numerical score ranging from 0.0 to 6 with "6" for raw milk and "1.0" for nearly complete denaturation of the milk proteins. Error deviation is about ±0.2.

In conventional canned evaporated milk industry practice, typical forewarmed milk WPN values will range from about 0.4 to 0.6 which indicate severe protein denaturation. In contrast, the present raw milk forewarming step is practiced until the forewarmed milk has a WPN essentially ranging from about 4.5 to 5.5, preferably from about 3.0 to 5.0 and most preferably about 5.3. Since, as is well known, milk protein denaturation by heating is a time/temperature relationship, various combinations of time and temperature can realize milks having the same degree of protein denaturation. Generally, higher temperatures and longer processing times yield milks having increased protein denaturation and thus lower WPN values.

Suitable types of raw milk which can be employed include bovine milk of varying weight concentrations of butterfat, e.g., whole milk, 2% butterfat milk and skim milk. The term "raw" is used herein in its conventional usage in the dairy industry to refer to milk which has not been heat treated and thus is characterized by a WPN of 6. Even filled raw milk (i.e., milk with fat other than butterfat) can be used in whole or in part. The concentrated milk blend fraction of the present invention comprises from about 1.0% to 9% of fat. The fat can be supplied, and in a preferred embodiment of the present invention is supplied, by the butterfat or dairy fat associated with whole milk. However, the fat can be supplied by adding dairy or other types of edible triglyceride fat. As described below, if added fats are employed, the fats are desirably added after the milk concentration step, but before the subsequent milk homogenization step.

Before the milk is concentrated, a stabilizer salt is desirably added to the milk. The stabilizer salt addition aids prevention of milk gelation. Such stabilizer salts are well known in the art (see, for example, U.S. Pat. No. 3,348,955 issued Oct. 24, 1967 to A. P. Stewart which is incorporated herein by reference). Suitable salts include sodium hexametaphosphate, disodium phosphate, sodium citrate, and mixtures thereof. The salt is added such that it comprises from about 0.01% to 0.1% of the milk.

Concentration

After the forewarming step, the milk is concentrated in a conventional manner under mild, i.e., low temperature conditions. In a preferred embodiment, the milk is concentrated by vacuum evaporation at a temperature of less than about 150° F., i.e., at pressures ranging from about 380 to 730 mm. The milk is concentrated until the total solids content including fat ranges essentially between about 25% to 36%. After the concentration step, the WPN value of the concentrated milk should essentially range from about 3.5 to 4.5 and preferably from about 3.4 to 4.2.

Blending of Milk Blend Fraction

After concentrating, the balance of the milk blend essential and optional components are added to the concentrated milk. The additional milk blend components essentially comprise nutritive carbohydrate sweetening agents, casein reactive gums, and, if needed, edible triglyceride fat materials. Optional components can include flavors, colors, and thickeners.

Suitable nutritive carbohydrate sweetening agents for addition to the milk blend are those described supra for employment in the dry mix fraction. The sweetening agents are added to the concentrated milk blends such that they essentially comprise from about 1% to 7%, preferably 2% to 5%, and most preferably from about 2.5% to 3.5% of the milk blend.

In a preferred embodiment of the present invention, a mixture of sucrose and corn syrup, e.g., high D.E. (e.g., 62 D.E.) are employed. In this preferred embodiment, sucrose is added to the milk blend such as to comprise from about 1% to 6%. The corn syrup comprises from about 3% to 4% of the milk blend.

After concentration, the milk blend fraction essentially comprises from about 1% to 9%, preferably from about 5% to 9% and, most preferably from about 6.5% to 8.5% of fat. Generally, when raw whole milk is employed in the present method of concentrated milk blend fraction preparation, supplemental fat is not required to yield concentrated milk fractions having sufficient fat levels. However, if raw milks of lower fat contents than whole milk are employed, then supplemental fat sufficient to realize the essential fat levels herein can be supplied in whole or in part from additional dairy or from nondairy edible triglyceride fat materials. Maintenance of the fat level within the above ranges is important to the provision of frozen desserts having a desirably rich creamy mouth feel. Further, excessively high fat levels can result in frozen desserts which are unspoonable at freezer temperatures (e.g., 0° F.) due to dominance of the fat phase's physical properties at such temperatures.

Suitable non-dairy edible triglyceride fats should be bland in taste (i.e., deodorized) and light in color (i.e., having a Gardner color scale value of less than 4). Both liquid and solid triglyceride fats can be used as well as mixtures thereof so long as the solid fat will melt easily in the mouth thereby not contributing a waxy taste to the frozen dessert when eaten. Suitable solid fats will be 85% melted, i.e., have less than 15% solids, at a temperature of 98° F. Preferred fats include mixtures of liquid and solid fats having a solid fat index ("SCI") profile similar to 76° coconut oil, i.e., having a SCI of about 40 to 50 at 50° F., and a SCI of about 15 to 20 at 70° F. Such preferred fats are desirable, in part, due to their whippability.

The present supplemental non-dairy fats can be derived from any naturally occurring glyceridic material whether vegetable, animal or marine such as soybean oil, cottonseed oil, peanut oil, sesame seed oil, coconut oil, palm oil, palm kernel oil, tallow and sunflower seed oil. Fats of the preferred SCI profiles can be realized by blending of suitable liquid and solid fat fraction, graining followed by separation of liquid oil fractions, or by hydrogenation or directed interesterification of liquid oils. Other suitable fat materials and methods of fat preparation are described in detail in Bailey's "Industrial Oil and Fat Products," (3rd Ed. 1964) which is incorporated herein by reference.

The milk blend fraction also essentially comprises from about 0.001% to 0.7%, preferably about 0.05% to 0.1% and most preferably from about 0.06% to 0.08%, of a casein reactive gum on a dry basis. Addition of such casein reactive gums also aids the minimization of undesirable milk protein precipitation. Such gums are also referred to in the art as "high milk reactivity gums." Gums of this type are evidenced by higher viscosities in the presence of casein compared to water solutions of equivalent gum concentrations due to gum/protein interactions. Exemplary materials suitable for use herein as a casein reactive gum include kappa carrageenan, xanthan, guar, and mixtures thereof. Preferred casein reactive gums for use herein are selected from the group consisting of kappa carrageenan, xanthan gum and mixtures thereof.

Optionally, additional thickeners can be added such as carboxymethyl cellulose, and microcrystalline cellulose. Each of these materials as well as their methods of preparation are well known (see, for example, U.S. Pat. No. 3,157,518 issued Nov. 17, 1964 to Battista which is incorporated herein by reference).

Sterilization

After the milk blend has been formed, the milk blend is heat sterilized. Heat sterilizing is another time/temperature relationship. In the present invention, heat sterilization can be accomplished by heating the concentrated milk blend at from about 220° F. to 300° F. for from about 1 to 8 sec. While the exact sterilization technique, that is, particular time and temperature, is not critical, it is important in the present process that the heat sterilization be practiced such that the WPN value of the milk blend range from about 1.0 to 1.8 and preferably from about 1.2 to 1.5 after sterilization. Conventional milk sterilization for concentrated milk, in contrast, typically result in milk having WPN values of less than about 0.6. Excessive protein denaturation indicated by lower WPN values can result in milk products exhibiting undesirably reduced whippability as well as an undesirable cooked milk flavor.

After sterilization, the milk is desirably cooled to within about 150° F. to 175° F. before homogenization.

Homogenization

After the milk has been sterilized, the milk is then homogenized. The essential homogenization step serves to break up the fat globules and to disperse the globules throughout the milk blend.

The present homogenization step is practiced using conventional homogenization parameters and apparatus. Although homogenization can be accomplished in one stage, two-stage homogenizers are commonly used in the food and dairy industry since they have the best homogenizing effects. In the first stage, the fat globules are reduced in size. The pressure used in the first stage can range from about 2,000 to 2,500 psi. Generally, the higher the fat levels in the sterilized milk blend, the lower the pressures which should be used in the first stage. The second stage disperses the reduced-size fat globules throughout the sterilized milk blend. In the second stage, the pressure should be low enough such that the globules formed during the first stage are not churned. Churning the fat globules, of course, would undesirably transform the dispersed fat into butter. Accordingly, second stage homogenization pressures should range from between about 500 to 800 psi.

After homogenization, the milk should be cooled to about 50° F. to 70° F. prior to canning.

Canning

Next, the milk blend is desirably packaged into an air-impermeable container. Suitable containers include, for example, cans, retort pouches and brick packs.

Tempering

An optional, but highly preferred, step after the milk has been packaged, is to "temper" or "rest" the canned milk by storing or holding at 40° F. to 60° F. for about 12 to 24 hours. The tempering step is a "resting stage" whereby more energy is removed from the system.

Aging

After the milk has been packaged and, if desired, tempered, the milk is desirably aged at from about 90° F. to 100° F. for from about 5 to 14 days. During controlled aging, the proteins of the milk cross link to some extent. Such controlled aging unexpectedly increase the whipping properties and improves both the body and texture of the finished frozen dessert. The aging is another time/temperature relationship. Accordingly, sufficient aging is determined by the viscosity increase of the milk blend. The initial viscosity of the milk blend typically ranges from about 7 to 10 cp. (measured at 70° F.). The milk is then aged until the viscosity essentially ranges from about 20 to 25 cp. and preferably from about 20 to 23 cp. (measured at 70° F.). Although the viscosity increase is modest, this controlled aging is unexpectedly essential to the realization of the present frozen dessert mixes. Unexpectedly, it has been found that at lower temperatures, the desirable viscosity increase due to protein interaction is uncertain, even with extended storage. At higher temperatures, the viscosity increase can be sudden and thus difficult to control and to prevent setting into a gel.

Aging does not have a significant effect on protein denaturation. Therefore, after aging, the WPN value of the aged milk blend fraction of the canned, concentrated milk blend of the present invention is about the same as after sterilization and thus essentially ranges between about 1.0 to 1.8, and preferably between about 1.2 to 1.5 and most preferably about 1.5.

Packaging

A two-package system is contemplated herein to deliver the dessert mix to the consumer. One pouch would contain the dry mix fraction, e.g., sealed foil or cellophane, while the other, e.g., tin plated steel can or brick pack, would contain the milk blend fraction. The two packages individually are shelf-stable and can be stored for an extended period of time. An additional benefit to the two-package system is the ease with which desserts can be prepared with the fluid milk blend fraction packaged separately from the pourable dry mix fraction.

Dessert Mix Use

It is contemplated that the consumer would purchase the two pouch kits and then proceed to mix the ingredients of the pouches at his convenience. The resulting mixture is then aerated by whipping with a home mixer, at for example, high speed for about 1 to 5 minutes. Aeration should be continued until about 50% to 150% overrun is achieved. The overrun, of course, refers to the percentage of increase in volume of the mixture.

Such aeration insures the provision of frozen desserts having densities similar to those of ice cream, ice milk, or an ice cream shake. These densities range from 0.2 to 0.95 g./cc. with a density of about 0.35 to 0.50 g./cc. being preferred.

The aerated mixture can then be statically cooled to below a temperature of about 8° F. to harden the dessert such as by placement in the freezing compartment of a home refrigerator or freezer. While it is contemplated that the dessert will be consumed in its hardened or frozen form, it is an advantage of the present invention that the product is heat-shock stable. Thus, the aerated mixture may be frozen, withdrawn from the freezer and allowed to warm, for example, one hour, and statically refrozen to form a dessert of equivalent organoleptic attributes.

Of course, the dessert compositions of the present invention can be prepared by mixing, aerating, and concurrently freezing using conventional aerated frozen dessert freezers. However, whether prepared at home by the consumer employing static freezing or prepared commercially prior to eventual sale, the present aerated frozen dessert compositions can be stored for extended periods at 0° F. without the development of large ice crystals.

Still another advantage of the present composition is that no tempering is required prior to serving. Most frozen desserts require upon removal from the freezer a period of time in order for them to come up to a serving temperature before they are servable. The present aerated frozen dessert products, however, can be cut, spooned, etc. at freezer temperatures and therefore need no tempering. Thus, the frozen dessert products can be consumed at lower temperatures.

The dessert mix compositions of the present invention are illustrated by the following examples:

EXAMPLE I

A two-packet frozen dessert of the present invention is prepared having the following composition:

| COMPONENT Ingredients | Weight | % Weight | A-MOUNT |
|---|---|---|---|
| A. Dry Blend Fraction | | | 78.5 g. |
| Sucrose | 53.00 g. | 67.51% | |
| Malto Dextrin | 16.00 | 20.38 | |
| Non-fat dry milk solids | 5.50 | 7.02 | |
| Flavor | 2.02 | 2.57 | |
| Whipping agent[1] | 1.84 | 2.34 | |
| Xanthan gum | 0.06 | 0.08 | |
| Carrageenan gum | 0.08 | 0.10 | |
| | 78.50 g. | 100.00% | |
| B. Milk Blend Fraction | | | 310.0 g. |
| Evaporated whole milk | | | |
| Fat | 25.48 g. | 8.22% | |
| Non-fat milk solids | 55.45 | 17.89 | |
| Water | 218.80 | 70.58 | |
| Corn Syrup (64 D.E.) | 9.13 | 2.94 | |
| Microcrystalline cellulose[2] | 0.77 | 0.24 | |
| Sodium hexametaphosphate | 0.30 | 0.10 | |
| Annatto food color | 0.04 | 0.02 | |
| Carrageenan[3] | 0.03 | 0.01 | |
| | 310.00 g. | 100.00% | |

[1] A soy protein hydrolyzate (Gunther D-100WA manufactured and sold by A. E. Staley Mfg. Co.)
[2] Avicel 591 marketed by F.M.C. Corp.
[3] Type K-100 marketed by Kelco (a division of Merck & Co., Inc.)

The concentrated milk blend fraction is prepared by forewarming apx. 2,000 lbs. of raw whole milk (WPN of 6.0 and having 3.5% butterfat) in a stainless steel 500 gal. agitated vessel and heated to about 180° F. After 15 min., the WPN is analytically determined to be about 5.5. Thereafter, apx. 0.82 lbs. of sodium hexametaphosphate is added to the milk and agitated. Thereafter, the milk is concentrated in a Buffalo-Vac double effect evaporator (Blon-Knox Corp.) to a total solids level of 27% (non-fat 18.5%; butterfat 8.5%). The operating temperature and pressure are 100° F., 730 mm. and 148° F. and 380 mm. respectively in the double effect evaporator. After concentration, the WPN of the concentrated milk is determined analytically to be 4.0.

Then, apx. 0.08 lbs. of carrageenan, 25 lbs. of corn syrup, 2.2 lbs. of the microcrystalline cellulose and 0.11 lbs. of color are blended into the concentrated milk to form the concentrated milk blend. The blend is then sterilized in a spiral therm heat exchanger at 300° F. for 8 sec. and cooled to 170° F. The cooled milk blend is then homogenized in a two stage homogenizer at 2,000 to 2,100 psi. in the first stage and 650 to 700 psi. in the second. The milk blend is then canned in 10 oz. cans (apx. 390 g.) and rested at 50° F. for 24 hours. Then, the canned milk blend fraction is aged for 5 days at 100° F. After four days, samples are drawn periodically and tested for viscosity. When the viscosities are about 21–22 cp. (at 70° F.), the cans of milk blend fraction are withdrawn from the elevated temperature storage. The WPN of the milk blend fraction so prepared is about 1.4.

The dry mix fraction is prepared by simply mixing together in any order the dry mix fraction ingredients to form a homogeneous blend. Thereafter, measured quantities are packaged in sealed paper pouches weighing apx. 2.76 oz. (78.5 g.)

A dessert is prepared by blending one package of dry mix with one can of milk blend concentrate in a quart-sized mixing bowl using a kitchen type electric mixer for one minute at low speed to fully hydrate the blend. After aerating by high speed mixing for four minutes, the product is placed in appropriate containers (apx. 1 qt.) and frozen at 0° F. for about four hours.

The frozen dessert so prepared spoons easily, has a density of apx. 0.85 g./cc., and has a flavor and texture similar to commercially prepared ice cream.

EXAMPLE II

A two-packet frozen dessert of the present invention is prepared having the following formulation:

| COMPONENT Ingredients | Weight | % Weight | A-MOUNT |
|---|---|---|---|
| A. Dry Mix Fraction | | | 60.0 g. |
| Sucrose | 45.00 g. | 75.00% | |
| Malto Dextrin | 7.38 | 12.30 | |
| Non-fat dry milk solids | 3.60 | 6.00 | |
| Flavor | 1.27 | 2.11 | |
| Whipping agent[1] | 1.20 | 2.00 | |
| Artificial cream | 0.77 | 1.29 | |
| Xanthan gum | 0.72 | 1.20 | |
| Carrageenan gum | 0.06 | 0.10 | |
| | 60.00 g. | 100.00% | |
| B. Concentrated Milk Blend Fraction | | | 340.0 g. |
| Evaporated skim milk | | | |
| Non-fat milk solids | 73.28 g. | 21.55% | |
| Water | 219.83 | 64.65 | |
| Soybean Oil[2] | 28.90 | 8.50 | |
| Corn Syrup | 17.00 | 5.00 | |
| Microcrystalline | | | |

-continued

| COMPONENT Ingredients | Weight | % Weight | A-MOUNT |
|---|---|---|---|
| cellulose[3] | 0.85 | 0.25 | |
| Sodium hexametaphosphate | 0.06 | 0.02 | |
| Food color | 0.05 | 0.02 | |
| Carrageenan[4] | 0.03 | 0.01 | |
| | 340.00 g. | 100.00% | |

[1]A soy protein hydrolyzate (Gunther D-100WA manufactured and sold by A. E. Staley Mfg. Co.)
[2]Durkex 25, a partially hydrogenated soybean oil marketed by Glidden-Durke, Inc.
[3]Avicel 591 marketed by F.M.C. Corp.
[4]Type K-100 marketed by Kelco (a division of Merck & Co., Inc.)

The milk blend fraction of Example II is prepared in a similar manner to that described in Example I except that the soybean oil is added along with the other milk blend ingredients prior to heat sterilization.

EXAMPLE III

A two-packet frozen dessert of the present invention is prepared having the following composition:

| COMPONENT Ingredients | Weight | % Weight | A-MOUNT |
|---|---|---|---|
| A. Dry Blend Fraction | | | 140 g. |
| Sucrose | 70.00 g. | 50.00% | |
| Spray Dried 76° Coconut Oil[1] | 22.50 | 16.07 | |
| Malto Dextrin | 31.33 | 22.38 | |
| Non-fat milk solids[2] | 11.20 | 8.00 | |
| Flavor | 2.14 | 1.53 | |
| Whipping agent | 1.05 | 0.75 | |
| Artificial cream flavor | 0.97 | 0.70 | |
| Guar gum | 0.70 | 0.50 | |
| Carrageenan gum | 0.01 | 0.07 | |
| | 140.00 g. | 100.00% | |
| B. Concentrated Milk Blend Fraction | | | 281 g. |
| Evaporated skim milk Non-fat milk solids | 57.63 g. | 20.51% | |
| Water | 192.94 | 68.66 | |
| Coconut Oil | 21.00 | 7.47 | |
| Corn Syrup (42 D.E.) | 9.10 | 3.24 | |
| Disodium phosphate | 0.25 | 0.09 | |
| Food color | 0.05 | 0.02 | |
| Carrageenan gum | 0.03 | 0.01 | |
| | 281.00 g. | 100.00% | |

[1]Beatreme 3497 by Beatrice Foods, Co.
[2]Supplied by Land-O-Lakes

The milk blend fraction is prepared in a manner similar to that described in Example II.

What is claimed is:

1. A two-packet dessert mix, comprising:
    A. From about 15% to 35% by weight of the dessert mix of a dry blend fraction, comprising:
        (1) from about 50% to 70% by weight of the dry blend fraction of a nutritive carbohydrate sweetening agent,
        (2) from about 3% to 8% of non-fat dry milk solids,
        (3) from about 1% to 2% of a whipping agent, and
        (4) from about 0.1% to 1.2% of a stabilizer gum selected from the group consisting of xanthan, carrageenan, guar, and mixtures thereof,
    B. From about 65% to 85% by weight of the dessert mix of a milk blend fraction, comprising:
        (1) from about 1% to 9% by weight of the milk blend fraction of fat,
        (2) from about 17% to 21% non-fat milk solids,
        (3) from about 1% to 7% of a nutritive carbohydrate sweetening agent,
        (4) from about 0.001% to about 0.1% of a casein reactive gum selected from the group consisting of kappa carrageenan, xanthan, guar, and mixtures thereof,
        (5) from about 0.01% to 0.1% of a stabilizer salt,
        (6) from about 65% to 75% moisture; and wherein the milk blend fraction has a viscosity of from about 20 to 25 cp., and a whey protein nitrogen value of about 1.0 to 1.8.

2. The dessert mix of claim 1 comprising from about 20% to 25% by weight of the dessert mix of the dry blend fraction and from about 75% to 80% by weight of the dessert mix of a milk blend fraction.

3. The dessert mix of claim 2 wherein the milk blend fraction has a whey protein nitrogen value of about 1.0 to 1.3 and a viscosity of about 20 to 23 cp.

4. The dessert mix of claim 3 wherein the dry blend fraction comprises
    (1) from about 60% to 70% by weight of the dry blend fraction of a nutritive carbohydrate sweetening agent,
    (2) from about 5% to 6% of low heat non-fat dry milk solids,
    (3) from about 1.0% to 1.5% of a whipping agent, and
    (4) from about 0.5% to 1.2% of a stabilizer gum selected from the group consisting of xanthan, carrageenan, guar, and mixtures thereof.

5. The dessert mix of claim 4 wherein the milk blend fraction comprises
    (1) from about 5% to 9% by weight of the milk blend fraction of fat,
    (2) from about 2% to 5% of a nutritive carbohydrate sweetening agent and from about 0.05% to 0.1% of a casein reactive gum.

6. The dessert mix of claim 5 wherein the milk blend fraction comprises from about 2.5% to 3.5% of the nutritive carbohydrate sweetening agent, from about 6.5% to 8.5% of fat and from about 0.06% to 0.08% of the casein reactive gum.

7. The dessert mix of claim 6 wherein the dry blend fraction comprises from about 65% to 70% of the nutritive carbohydrate sweetening agent and wherein the nutritive carbohydrate sweetening agent is selected from the group consisting of sucrose, invert sugar, dextrose, glucose, lactose, honey, maltose, fructose, maple syrup, starch hydrolyzates, and mixtures thereof.

8. The dessert mix of claim 7 wherein the dry blend fraction comprises from about 20% to 23% by weight of the dessert mix and wherein the milk blend fraction comprises from about 77% to 80% by weight of the dessert mix.

9. The dessert mix of claim 8 wherein the milk blend fraction has a whey protein nitrogen value of about 1.2 to 1.5, and a viscosity of from about 20 to 23 cp. and wherein the stabilizer salt is selected from the group consisting of sodium hexametaphosphate, disodium phosphate, sodium citrate, and mixtures thereof.

10. A process for the preparation of a whippable, concentrated milk blend, comprising the steps of:
    A. forewarming raw milk at from about 175° F. to 210° F. until the forewarmed milk has a whey protein nitrogen ("WPN") value of about 4.5 to 5.5; said forewarmed milk containing a stabilizer salt at from about 0.05% to 0.1% by weight on a solids basis; then B. concentrating the milk at from about 730 mm. to 380 mm. pressure until the total solids concentration is from about 25% to 36% by weight to form thereby a concentrated milk having a WPN ranging from about 3.5 to 4.5 thereafter
C. adding to the concentrated milk,
  (1) from about 1% to 7% of a nutritive carbohydrate sweetening agent; and
  (2) from about 0.001% to 0.1% of a casein reactive gum; and
  (3) sufficient fat such that the total fat comprises from about 1% to 9% of the concentrated milk to thereby form a concentrated milk blend;
D. heat sterilizing the concentrated milk blend to provide a sterilizer milk blend having a whey protein nitrogen value of about 1.0 to 1.8;
E. cooling the sterilized milk blend to about 150° F. to 175° F.; then
F. homogenizing the milk blend to form a homogenized milk blend;
G. cooling the homogenized milk blend to within about 70° F. to 50° F.;
H. canning the homogenized milk blend to form a canned milk blend; and
I. aging the canned milk blend at from about 90° F. to 100° F. for about 5 to 14 days to a viscosity of about 20 to 25 cp. (at 70° F.).

11. The process of claim 10 wherein the canned milk blend is aged at from about 90° F. to 100° F. for about 5 to 14 days to a viscosity of about 20 to 23 cp. (at 70° F.).

12. The process of claim 11 wherein from about 2% to 5% of a nutritive carbohydrate sweetening agent and from about 0.05% to 0.1% of a casein reactive gum and, sufficient fat such that the total fat comprises from about 5% to 9% of the concentrated milk are added to the concentrated milk.

13. The process of claim 12 additionally comprising this step of tempering the canned milk blend at from about 40° F. to 60° F. for about 12 to 24 hours prior to aging the canned milk blend.

14. The process of claim 13 wherein the heat sterilizing step is practiced at from about 220° F. to 300° F. for about 1 to 8 seconds.

15. The process of claim 14 wherein the forewarming step is practiced such as to provide a forewarmed milk having a WPN of about 5.0 to 5.5.

16. The process of claim 15 wherein the homogenizing step is practiced in two stages and wherein the homogenizing pressure in the first stage ranges from about 2,000 to 2,500 psi. and wherein the pressure in the second stage ranges from about 500 to 800 psi.

17. The process of claim 16 wherein the concentrated milk is added from about 2.5% to 3.5% of a nutritive carbohydrate sweetening agent, from about 0.06% to 0.08% of a casein reactive gum and sufficient fat such that the total fat comprises from about 6.5% to 8.5% of the concentrated milk.

18. The process of claim 17 wherein the raw milk has a butterfat content of about 3.5%.

19. The process of claim 18 wherein the nutritive carbohydrate sweetening agent comprise a mixture of sucrose and corn syrup.

20. The process of claim 19 wherein the casein reactive gum is selected from the group consisting of kappa carrageenan, xanthan, guar gum, and mixtures thereof.

* * * * *